United States Patent
Anand et al.

(10) Patent No.: US 9,485,183 B2
(45) Date of Patent: Nov. 1, 2016

(54) SYSTEM AND METHOD FOR EFECTUATING PACKET DISTRIBUTION AMONG SERVERS IN A NETWORK

(71) Applicant: TELEFONAKTIEBOLAGET L M ERICSSON (PUBL), Stockholm (SE)

(72) Inventors: Prashant Anand, Bangalore (IN); Ashutosh Bisht, Bangalore (IN); Mustafa Arisoylu, San Jose, CA (US); Ashish Anand, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 217 days.

(21) Appl. No.: 14/262,406

(22) Filed: Apr. 25, 2014

(65) Prior Publication Data
US 2015/0312155 A1  Oct. 29, 2015

(51) Int. Cl.
H04L 12/801 (2013.01)
H04L 12/743 (2013.01)
H04L 12/851 (2013.01)

(52) U.S. Cl.
CPC ......... H04L 47/18 (2013.01); H04L 45/7453 (2013.01); H04L 47/2483 (2013.01)

(58) Field of Classification Search
CPC ... H04L 47/18; H04L 47/2483; H04L 47/70; H04L 67/1002; H04L 67/1023; H04L 47/10; H04L 47/125; H04L 45/38; H04L 45/7453; H04L 47/2441; H04L 45/74; H04L 67/1004
See application file for complete search history.

(56) References Cited

U.S. PATENT DOCUMENTS

| | | |
|---|---|---|
| 5,960,431 A | 9/1999 | Choy |
| 6,282,605 B1 | 8/2001 | Moore |
| 6,601,084 B1 | 7/2003 | Bhaskaran et al. |
| 6,944,678 B2 | 9/2005 | Lu et al. |
| 7,321,926 B1 | 1/2008 | Zhang et al. |
| 7,328,237 B1 | 2/2008 | Thubert et al. |
| 7,647,424 B2 | 1/2010 | Kim et al. |
| 7,653,700 B1 | 1/2010 | Bahl et al. |
| 7,808,897 B1 | 10/2010 | Mehta et al. |
| 7,822,871 B2 | 10/2010 | Stolorz et al. |
| 7,908,605 B1 | 3/2011 | Graupner et al. |
| 8,136,025 B1 | 3/2012 | Zhu et al. |
| 8,547,878 B2 | 10/2013 | Sundararaman et al. |
| 8,825,867 B2 | 9/2014 | Arisoylu et al. |
| 8,838,817 B1* | 9/2014 | Biswas .......... H04L 45/38 709/230 |

(Continued)

OTHER PUBLICATIONS

Mori T. et al., "Identifying Elephant Flows Through Periodically Sampled Packets," In *Proceedings of the 4th ACM SIGCOMM conference on Internet measurement* (IMC '04). ACM, New York, NY, USA, Oct. 2004, pp. 115-120.

(Continued)

*Primary Examiner* — Pao Sinkantarakorn
*Assistant Examiner* — Michael Phillips

(57) ABSTRACT

A packet distribution scheme for forwarding incoming packets to servers in a network. Depending on a hash value of the incoming flow's identification parameters, a hash flow table or database is queried to determine the server to which the packet is to be forwarded. If multiple flows have the same hash index and are associated with different servers, a secondary flow table or database is queried for determining the server. In an example implementation, only the secondary flow table is configured to store fully qualified flow identification parameters whereas the hash flow table is operative to store reduced or compressed state information.

21 Claims, 8 Drawing Sheets

(56) References Cited

U.S. PATENT DOCUMENTS

| | | | |
|---|---|---|---|
| 8,929,374 B2 | 1/2015 | Tonsing et al. | |
| 8,958,293 B1* | 2/2015 | Anderson | H04L 67/1002 370/230 |
| 9,036,481 B1* | 5/2015 | White | H04L 47/18 370/235 |
| 9,118,571 B2 | 8/2015 | Bisht et al. | |
| 9,137,165 B2 | 9/2015 | Anand et al. | |
| 2002/0032798 A1 | 3/2002 | Xu | |
| 2002/0194342 A1 | 12/2002 | Lu et al. | |
| 2002/0194345 A1 | 12/2002 | Lu et al. | |
| 2002/0194350 A1 | 12/2002 | Lu et al. | |
| 2003/0065762 A1 | 4/2003 | Stolorz et al. | |
| 2003/0177253 A1* | 9/2003 | Schuehler | H04L 43/18 709/230 |
| 2004/0049596 A1* | 3/2004 | Schuehler | H04L 43/18 709/238 |
| 2005/0261985 A1 | 11/2005 | Miller et al. | |
| 2006/0221974 A1 | 10/2006 | Hilla | |
| 2006/0233106 A1 | 10/2006 | Achlioptas | |
| 2006/0288119 A1 | 12/2006 | Kim et al. | |
| 2009/0141638 A1 | 6/2009 | Dolisy | |
| 2009/0161696 A1 | 6/2009 | Song | |
| 2009/0201935 A1 | 8/2009 | Hass et al. | |
| 2010/0080233 A1 | 4/2010 | Kwapniewski et al. | |
| 2010/0265835 A1* | 10/2010 | Haley | H04L 12/26 370/252 |
| 2011/0026403 A1* | 2/2011 | Shao | H04L 67/2895 370/235 |
| 2011/0142064 A1* | 6/2011 | Dubal | H04L 47/122 370/412 |
| 2011/0145386 A1 | 6/2011 | Stolorz et al. | |
| 2011/0185065 A1 | 7/2011 | Stanisic et al. | |
| 2011/0191477 A1 | 8/2011 | Zhang et al. | |
| 2012/0002546 A1 | 1/2012 | Sundararaman et al. | |
| 2012/0020210 A1 | 1/2012 | Sonnier et al. | |
| 2012/0095974 A1 | 4/2012 | Bentkofsky et al. | |
| 2012/0179607 A1 | 7/2012 | Abifaker et al. | |
| 2012/0281698 A1 | 11/2012 | Forster et al. | |
| 2013/0064088 A1 | 3/2013 | Yu et al. | |
| 2013/0136011 A1 | 5/2013 | Tardo et al. | |
| 2013/0266014 A1* | 10/2013 | Blomquist | H04L 45/7453 370/392 |
| 2013/0297798 A1 | 11/2013 | Arisoylu et al. | |
| 2014/0108638 A1 | 4/2014 | Ko et al. | |
| 2014/0211621 A1* | 7/2014 | Sundaram | H04L 47/41 370/231 |
| 2014/0372567 A1 | 12/2014 | Ganesh et al. | |
| 2015/0029853 A1* | 1/2015 | Raindel | H04L 47/127 370/235 |
| 2015/0078375 A1* | 3/2015 | Hendel | H04L 45/7453 370/389 |
| 2016/0080481 A1 | 3/2016 | Bisht et al. | |

OTHER PUBLICATIONS

Ben Fredj S. et al., "Statistical Bandwidth Sharing: A Study of Congestion at Flow Level," In Proceedings of ACM SIGCOMM, pp. 111-122, Aug. 2001.

Mori, T., et al. "On the characteristics of Internet traffic variability: Spikes and Elephants," In Proceedings of IEEE/IPSJ SAINT, Tokyo, Japan, Jan. 2004, the whole document.

Papagiannaki K. et al., "On the Feasibility of Identifying Elephants in Internet Backbone Traffic," Sprint ATL Technical Report TR01-ATL-110918, Sprint Labs, Nov. 2001, the whole document.

Thompson K. et al., "Wide-area internet traffic patterns and characteristics," IEEE Network, vol. 11, No. 6, Nov./Dec. 1997, pp. 10-23.

Lu, Y. et al., "ElephantTrap: A low cost device for identifying large flows," High-Performance Interconnects, Symposium on, 15th Annual IEEE Symposium on High-Performance Interconnects (HOTI 2007), 2007, pp. 99-105.

McKeown N. et al. "OpenFlow: Enabling Innovation in Campus Networks", Mar. 14, 2008, the whole document.

Uppal H. et al. "OpenFlow Based Load Balancing", University of Washington CSE651: Networking Project Report, reproduced Jun. 27, 2013, the whole document.

"OpenFlow Switch Specification", Version 1.1.0 Implemented (Wire Protocol 0x02), Feb. 28, 2011, the whole document.

* cited by examiner

FIG. 3A

| Hash Index ┌302A | Flow Exists (1-Bit) (Flow-Bit) ┌304 | Clash Exists (1-Bit) (Clash-Bit) ┌306 | Server ┌308 | Counter (4-Bit) ┌310 |
|---|---|---|---|---|
| 1 | Yes | No | S1 | 1 |
| 2 | Yes | Yes | S1, S2 | 1 |
| 3 | No | No | - | 0 |
| ⋮ | ⋮ | ⋮ | ⋮ | ⋮ |
| N | Yes | No | S2 | 2 |

Hashing Function 216

300A

Data Fields 312

| Hash Index ┌302B | IP SRC ┌322 | IP Dest ┌324 | Protocol ┌326 | SRC Port ┌328 | DST Port ┌330 | Server ┌332 |
|---|---|---|---|---|---|---|
| 1 | 10.1.1.1 | 11.1.1.1 | TCP | 100 | 200 | S1 |
| 2 | 10.1.1.2 | 11.1.1.1 | TCP | 500 | 200 | S1 |
| ⋮ | ⋮ | ⋮ | ⋮ | ⋮ | ⋮ | ⋮ |
| K | . . . | . . . | . . . | . . . | . . . | . . . |

| Flow-Bit 306 / Clash-Bit 308 | Flow-bit is Set | Flow-bit is not set (clear) |
|---|---|---|
| Clash-bit is not set (Clear) | Condition 1: Send to associated server | Condition 2: Error Scenario. Drop Packet |
| Clash-bit is set | Condition 3: Query supplementary flow table | Condition 4: Error Scenario. Drop Packet |

SYSTEM AND METHOD FOR EFECTUATING PACKET DISTRIBUTION AMONG SERVERS IN A NETWORK

REFERENCE TO RELATED APPLICATION(S)

This application discloses subject matter that is related to the subject matter of the following U.S. patent application(s): (i) "TWO LEVEL PACKET DISTRIBUTION WITH STATELESS FIRST LEVEL PACKET DISTRIBUTION TO A GROUP OF SERVERS AND STATEFUL SECOND LEVEL PACKET DISTRIBUTION TO A SERVER WITHIN THE GROUP", application Ser. No.: 13/464,608, filed May 4, 2012, in the name(s) of Mustafa Arisoylu, Abhishek Arora and Prashant Anand, issued as U.S. Pat. No. 8,825,867; (ii) "METHODS OF FORWARDING/RECEIVING DATA PACKETS USING UNICAST AND/OR MULTICAST COMMUNICATIONS AND RELATED LOAD BALANCERS AND SERVERS", application Ser. No.: 13/919,375, filed Jun. 17, 2013, in the name(s) of Mustafa Arisoylu, Jayasenan Sundara Ganesh, Prashant Anand and Nandan Mahadeo Sawant, published as US 2014/0372616; (iii) "METHODS OF FORWARDING DATA PACKETS USING TRANSIENT TABLES AND RELATED LOAD BALANCERS", application Ser. No.: 13/919,388, filed Jun. 17, 2013, in the name(s) of Jayasenan Sundara Ganesh, Mustafa Arisoylu, Prashant Anand and Nandan Mahadeo Sawant; published as US 2014/0372567; and (iv) "METHODS OF LOAD BALANCING USING PRIMARY AND STANDB-BY ADDRESSES AND RELATED LOAD BALANCERS AND SERVERS", application Ser. No.: 13/919,411, filed Jun. 17, 2013, in the name(s) of Prashant Anand, Mustafa Arisoylu, Jayasenan Sundara Ganesh, and Nandan Mahadeo Sawant; issued as U.S. Pat. No. 9,137,165; each of which is hereby incorporated by reference in its entirety.

FIELD OF THE DISCLOSURE

The present disclosure generally relates to communication networks. More particularly, and not by way of any limitation, the present disclosure is directed to a system and method for distributing packets among servers disposed in a network.

BACKGROUND

There are numerous examples in networking where clients or service requesters communicate with servers or providers of services or resources over one or more networks. The clients or client stations typically request a resource or that a service be performed and the servers perform the service or provide the resource. Often a set of servers may be deployed in order to provide greater servicing capability, resiliency or high availability (e.g., in the event of a server failing or being taken off line), etc. As an example, a server farm may be used to provide services associated with web sites such as, e.g., e-commerce sites, search engine applications, Internet Relay Chat networks, high-bandwidth File Transfer Protocol sites, Network News Transfer Protocol (NNTP) servers, Domain Name System (DNS) servers, to name just a few examples.

Without limitation, server load balancing is briefly described herein as an example of packet distribution in a network. Server load balancing techniques may be used to distribute service requests from the clients among a set of servers in order to balance or more evenly distribute loads (e.g., processing loads or workloads) associated with handling the service requests among the set of servers. Server load balancing, within certain constraints, generally helps to prevent some of the servers from being over-loaded while other servers are being underutilized. Such server load balancing generally offers advantages such as increased resource utilization, increased performance, increased throughput, reduced response time, reduced server overload, etc. In addition, server load balancing may also be used in conjunction with providing resiliency or high availability by redistributing loads when one of the servers fails, is taken off line, etc.

SUMMARY

The present patent application discloses systems, methods, devices, apparatuses and associated computer-readable media having executable program instructions thereon for providing or otherwise facilitating efficient packet distribution within a network.

In one aspect, an embodiment of a packet distribution method operating at a packet distributor is described. The disclosed embodiment is operative for forwarding communication flows to one or more servers of a network. When a packet of a communication flow is received at the packet distributor, one or more flow identification parameters of the packet are processed, e.g., by a hash function, to obtain an index, e.g., a hash index, into a database. If the communication flow is a new flow, the packet is processed according to a new flow process at least based on the values of one or more data fields provided for the hash index in a first database portion. If the communication flow is determined to be an existing flow, the packet may be processed according to an existing flow process responsive at least in part to the values of one or more data fields provided for the hash index in the first database portion. On the other hand, if the received packet is determined to be an end-of-flow packet, the packet is processed according to an end-of-flow process responsive at least in part to the values of the hash index data fields provided the first database portion.

In one implementation, a packet distribution scheme of the present discloses involves, inter alia, depending on a hash value of the incoming flow's identification parameters, querying a hash flow table or database to determine the server to which the packet is to be forwarded. If multiple flows have the same hash index and are associated with different servers, a secondary or supplementary flow table or database is queried for determining the server. In an example implementation, only the secondary flow table is configured to store fully qualified flow identification parameters whereas the hash flow table is operative to store reduced or compressed state information.

In another aspect, an embodiment of a packet distributor node configured to forward communication flows to one or more servers in a network is disclosed. The disclosed packet distributor node comprises, inter alia: one or more processors coupled to a persistent memory; a hash flow table (HFT) module forming a portion of the persistent memory, wherein the HFT module is configured to store a plurality of hash indices obtained based on hashing one or more flow identification parameters associated with a plurality of incoming communication flows being received at the packet distributor node, each hash index having one or more data fields. A supplementary flow table (SFT) module forming a portion of the persistent memory is provided for storing fully qualified flow identification parameters with respect to communication flows that are assigned to different servers and have the same hash indices. A server association module, provided as part of the persistent memory, is configured to associate a server to an incoming communication flow received at the packet distributor node. A flow identification module, forming a portion of the persistent memory, is configured to identify whether an incoming packet is for an existing communication flow, a new communication flow or an end-of-flow packet to indicate termination of an existing communication flow. A packet processing module is provided for processing and forwarding an incoming packet of a communication flow at least based on the values of one or more data fields associated with a hash index of the incoming packet's flow identification parameters.

In a still further aspect, also disclosed herein is a non-transitory computer-readable medium containing instructions stored thereon which, when executed by one or more processors of a packet distributor node, facilitate forwarding of communication flows to one or more servers in a network. The claimed embodiment of the non-transitory computer-readable medium comprises, inter alia: a code portion for hashing one or more flow identification parameters of an incoming packet of a communication flow to obtain a hash index; a code portion, operative upon determining that the communication flow is a new flow, for processing the incoming packet according to a new flow process at least based on values of one or more data fields provided for the hash index in a first database portion; a code portion, operative upon determining that the communication flow is an existing flow, for processing the incoming packet according to an existing flow process at least based on the values of one or more data fields provided for the hash index in the first database portion; and a code portion, operative upon determining that the incoming packet is an end-of-flow packet, for processing the packet according to an end-of-flow process at least based on the values of one or more data fields provided for the hash index in the first database portion.

Advantages of the present invention include, but not limited to, a signficant reduction in memory required for storing state information in a network that encounters a large number of client flows. No special processing and/or communication overhead is needed between the packet distributor of the present invention and the set of servers to which the incoming packets are destined. Since flow state/session information is not replicated to all servers, bandwidth loss between the distribution node and server nodes is advantageously avoided. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 3A depicts an example hash flow table (HFT) database or module for use with an embodiment of a packet distribution scheme of the present patent application;

FIG. 3B depicts an example supplementary flow table (SFT) database or module for use with an embodiment of a packet distribution scheme of the present patent application;

FIG. 6 depicts an example conditionality matrix associated with certain data fields of a hash index for purposes of the present patent application;

DETAILED DESCRIPTION OF THE DRAWINGS

Figure 1:
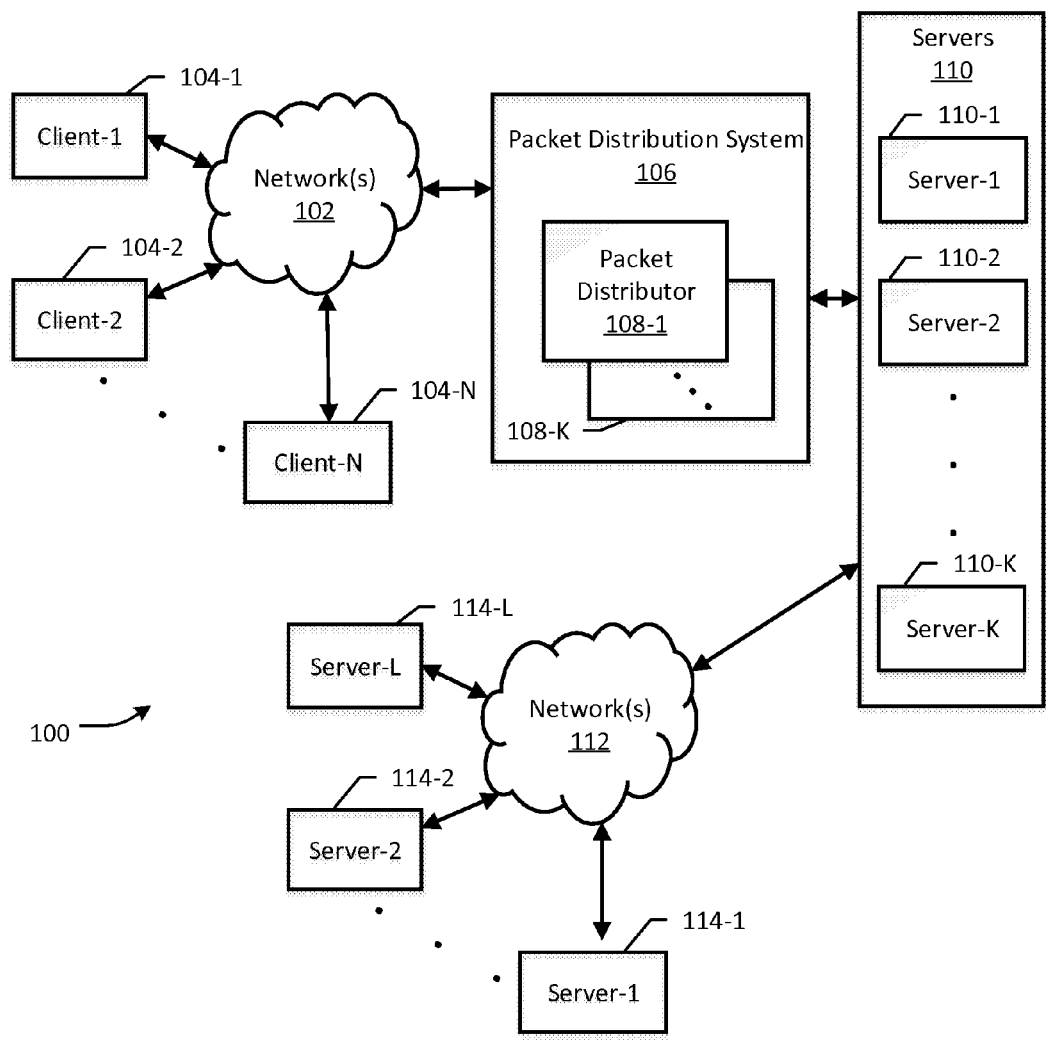
FIG. 1 depicts an example network environment wherein one or more embodiments of a packet distribution scheme of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node (e.g., a router, switch, bridge, etc.) is a piece of networking equipment, including hardware and software that communicatively interconnects other equipment on a network (e.g., other network elements, end stations, etc.). Some network elements in certain embodiments may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). For purposes of the present patent application, a network element may be deployed in enterprise networks, intranets, extranets, Internet service provider networks, border networks, and inter-connected networks, etc. Subscriber end stations (e.g., clients, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) may be configured to access content/services provided over the Internet and/or content/services provided on virtual private networks (VPNs) overlaid on (e.g., tunneled through) the Internet. The content and/or services are typically provided by one or more end stations (e.g., a plurality of server end stations or "server farms") belonging to a service or content provider or end stations participating in a peer-to-peer service, and may include, for example, public webpages (e.g., free content, store fronts, search services), private webpages (e.g., username/password accessed webpages providing email services), and/or corporate networks over VPNs. Typically, subscriber end stations may be coupled (e.g., through customer premise equipment coupled to an access network (wired or wirelessly)) to edge network elements, which are coupled (e.g., through one or more core network elements) to other edge network elements, which are coupled to other end stations (e.g., server end stations).

One or more embodiments of the present patent disclosure may be implemented using different combinations of software, firmware, and/or hardware. Thus, one or more of the techniques and blocks shown in the Figures (e.g., flowcharts) may be implemented using code and data stored and executed on one or more electronic devices or nodes (e.g., a subscriber/user equipment (UE) device, an end station or endpoint, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such elements or nodes may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or data transmission. The coupling of the set of processors and other components may be typically through one or more buses and bridges (also termed as bus controllers), arranged in any known (e.g., symmetric/shared multiprocessing) or heretofore unknown architectures configured to interoperate with any Operating System (OS). Thus, the storage device or component of a given electronic device or network element may be configured to store code and/or data for execution on one or more processors of that element, node or electronic device for purposes of implementing one or more techniques/embodiments of the present disclosure.

Referring now to FIG. 1, depicted therein is an example network environment 100 wherein one or more embodiments of the present patent application may be practiced. The example network environment 100 includes a plurality of subscriber end stations or clients 104-1 to 104-N that are operable to transmit/receive flows of packets (generally referred to as communication flows or packet flows) with respect to, e.g., consuming/receiving services from a server environment 110 that may comprise a plurality of servers 110-1 to 110-K configured to process the packets emanating from the client stations 104-1 to 104-N via suitable access/edge/core networks 102. An embodiment of a packet distribution system 106 comprising one or more packet distributor nodes or elements 108-1 to 108-K is advantageously disposed between the networks 102 and the server environment 110 for efficiently distributing the incoming packets (i.e., with respect to the communication flows emanating from client stations 104-1 to 104-N toward the servers 110-1 to 110-K) according to one or more embodiments set forth hereinbelow. In one example implementation, the packet distribution system 106 may be configured to provide "stickiness" of the flows to the servers assigned to process the packets of the flows and may be implemented as a stateful server load balancing/sharing system used to approximately evenly distribute or balance workloads associated with processing the packets among the servers 110-1 to 110-K. It should be appreciated, however, that other embodiments of the present disclosure are not necessarily limited to such server load balancing applications.

By way of illustration, clients 104-1 to 104-N may be coupled, connected, or otherwise in communication through one or more networks 102 to the packet distribution system 106, wherein each client may represent a combination of hardware and software (e.g., an Operating System and/or other suitable software platform and one or more client applications) that is capable of accessing services and/or resources over one or more network connections (e.g., wired and/or wireless). As alluded to previously, examples of suitable clients include, but are not limited to, wireless client devices (e.g., mobile phones, laptops, mobile computers, hand held devices, etc.) and wired client devices (e.g., desktop computers, set top boxes, etc.). The packet distribution system 106 is operatively coupled, connected, or otherwise in communication with servers 110-1 to 110-K via any suitable means, e.g., including switch fabrics, mesh networks, etc., wherein a server may represent any combination of hardware and software (e.g., an Operating System and/or other suitable software platform and one or more server applications) that is capable of providing services and/or content to clients through one or more network interfaces and/or otherwise operating as a server. Examples of suitable servers may include, but are not limited to, executable software on blades (e.g., blade servers), control cards, service cards, processors, processor cores, etc., and may be grouped or sub-grouped (virtual or otherwise) into smaller constellations of servers and/or otherwise hierarchically organized or partitioned.

Furthermore, alternatively or additionally, and without limitation, the set of servers 110-1 to 110-K may be disposed in communication with other servers 114-1 to 114-L through one or more networks 112 in some embodiments. By way of example, additional servers 114-1 to 114-L may be configured to provide service-chaining functionality with respect to the clients' flows. For instance, additional servers 114-1 to 114-L may perform service processing associated with the client flows, such as, for example, Deep Packet Inspection (DPI), Virus Scanning (VS), Intrusion Detection and Prevention (IDP), Firewall (FW) filtering, Network Address Translation (NAT), subscriber management, and the like.

In an example implementation, the packet distribution system 106 may be configured to distribute packets in a way that provides or maintains stickiness of flows of the packets to servers assigned to process the packets of the flows. Such flow stickiness may also sometimes be referred to as flow persistence. Distribution of packets with flow stickiness or flow persistence may involve distributing all of the packets of a particular flow to the same server. As will be seen in detail below, a flow assignment system (not explicitly shown) associated with and/or otherwise integrated with the packet distribution system 106 may initially allocate a flow (e.g., based on a first packet of the flow) to one of the servers. For example, the initial packet of an incoming flow (e.g. SYN packet of a TCP (Transmission Control Protocol) connection, an INIT packet of an SCTP (Stream Control Transmission Protocol) connection, etc.) is forwarded to a server based on a suitable assignment methodology. Subsequently, all of the other packets encountered for the same connection or flow may be forwarded to the same server. Whereas each server may maintain state (e.g., session data or information) that is associated with the flows that it is assigned to process, the overall state information for all the incoming flows may be maintained by the packet distribution system 106, which can be enormous in applications involving hundreds and thousands of flows. It should be appreciated that embodiments provided herein can advantageously compress or otherwise reduce the state/session information data necessary for efficiently distributing packets as will be set forth in detail below.

For purposes of the present patent application, a flow may represent network traffic that is identified by a common set of attributes that characterize the flow. As used herein, a flow represents more than a single packet (i.e., has at least two packets). As an example, a flow may represent network traffic identified by what are commonly known as five-tuple attributes (e.g., Source IP address (source-ip or IP SRC), Destination IP address (destination-ip or IP DEST), Protocol, Source TCP/UDP port (src-port), and Destination TCP/UDP port (dest-port)). As a second example, a flow may represent network traffic identified by Source/Destination MAC addresses. As a third example, a flow may represent network traffic identified by VLAN IDs. As another example, a flow may represent network traffic identified by source and destination nodes of the traffic. In yet another example, packets with a specific source IP address (e.g. IP1) passing over a certain link from node a to node b may represent a flow identified by the attributes (IP1, a, b). As a still further example, in an access network, traffic originated from a subscriber may represent a flow identified as the traffic passing through a specific port of the residential gateway. Such subscriber flows in access and edge networks may also be identified by the subscriber IP addresses. Upstream/downstream subscriber flow (i.e., the flow from the subscriber to the network side in upstream and the flow from the network side to the subscriber in downstream) may have the IP address of the subscriber as the source/destination IP address, respectively. A flow may include a single flow, multiple sub-flows, or many sub-flows. A larger coarse-grained flow may include multiple smaller finer-grained sub-flows. For example, an aggregate flow passing thorough a link (from node a to node b) with multiple destination IP addresses has a coarser granularity than a sub-flow passing through the same link with a single destination IP address. The former flow can be referred to as link flow and the latter flow can be referred to as link, destination IP flow.

Figure 2:
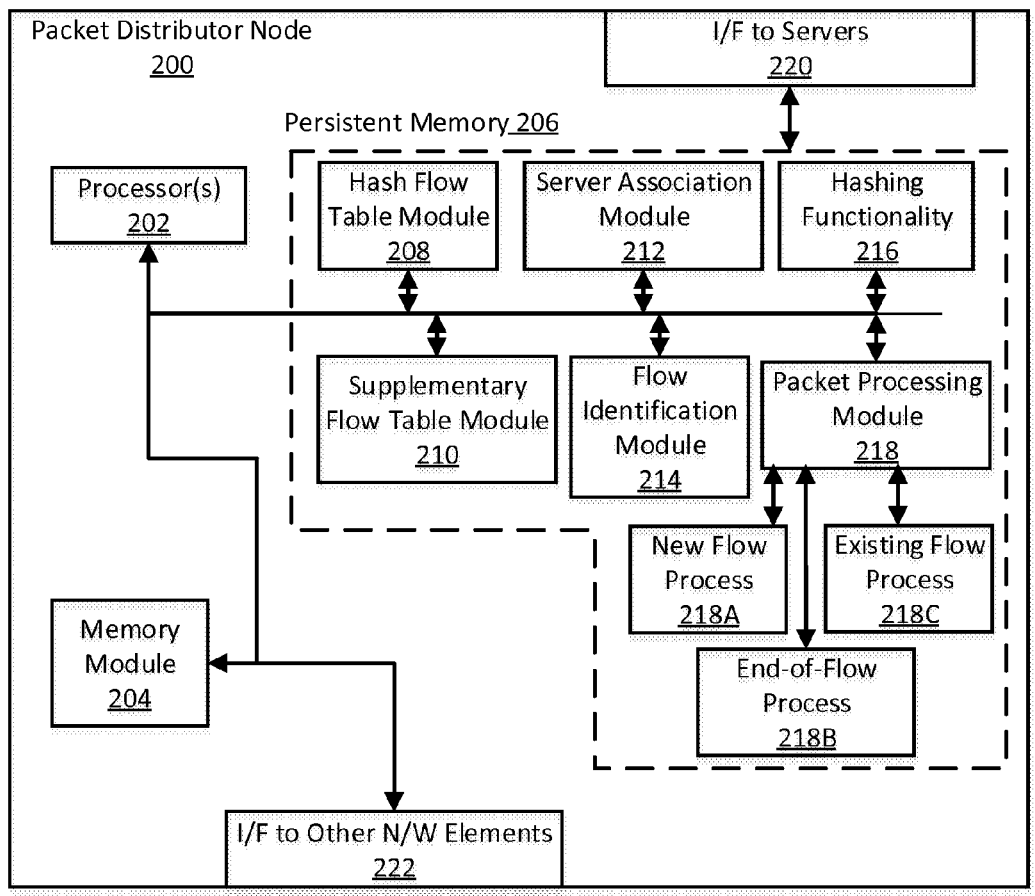
FIG. 2 depicts a block diagram of an example packet distributor node according to an embodiment of the present patent application.

FIG. 2 depicts a block diagram of an example packet distributor node or element 200 configured to distribute incoming packets according to an embodiment of the present patent application. One or more processors 202 coupled to at least one memory module 204 may be provided for executing various software/logic modules that are configured to compress the flow state information via appropriate hashing techniques. Additionally, where hashing techniques yield "collisions" (i.e., where flow identification parameters of multiple flows are hashed to same hash indices or values (also sometimes referred to as hash locations or buckets in a hash table or database)), appropriate logic/software modules are provided for resolving conflicts arising from assigning different servers to such flows. First, a synopsis of the overall packet distribution scheme of the present disclosure will be described, followed by a detailed description of several processes and sub-processes effectuated by the various modules and subsystems of the packet distributor node 200.

Starting with a new flow as an example, the packet distributor node 200 is configured to distribute the start-of-flow packet (a packet containing a new flow identifier or flag, e.g., a SYN packet in TCP or an INIT packet in SCTP) to all servers of a server pool. A server from the server pool may be assigned to the new flow (e.g., one of the servers may claim "ownership" of the flow or by virtue of any assignment method based on server resources, fairness, priority, etc.). The flow-to-server mapping may be stored in a database structure derived from hashing the flow identification parameters of the incoming flow. Advantageously, instead of storing the full flow identification information, only a single bit may be provided that is indicative of existence of a flow at a hash index that is obtained based on hashing the flow's identification (ID) parameters. For example, for a typical IPv4 flow, applicable ID parameters comprise source-IP, destination-IP, protocol id, src-port, and dest-port, which require 104 bits to identify a flow. However, by hashing this information to obtain a hash value (index or location) and allocating a single bit to indicate the presence of the flow at the hash value of the database (which may be referred to as a hash flow table or HFT module), the amortized storage requirement for identifying the flow (and associating it with a server) is significantly reduced. All subsequent packets of the flow may then be sent to the server based on the flow-to-server mapping maintained in the HFT module.

Although the foregoing scheme may yield a significant reduction in flow state maintenance at the packet distributor node, a potential issue may arise if multiple flows map to the same hash value (which is possible due to the inherent properties of hashing) and different servers are assigned to such flows. To resolve such a situation, additional data fields may be provided or otherwise associated with the hash locations of the HFT module, which data fields may be configured to provide suitable additional logic that triggers one or more queries into another database operative to maintain a more fully qualified flow identification information. A "clash" bit may be provided or otherwise associated with a particular hash location if the flow identification parameters of two flows that are assigned to two different servers are hashed to that same hash location. By configuring appropriate Boolean logic for the clash bit (e.g., setting the bit means there is a "clash" of servers and clearing or not setting the bit means there is no server clash), a supplementary or secondary flow table (SFT) or module that maintains another server mapping may be queried as needed in order to obtain/determine the server associated with the flow. Using such a scheme, multiple flow sessions can be mapped to the same hash bucket and represented through a single bit. Additionally, a counter may be provided or otherwise associated with the hash buckets for keeping track of multiple flows that hash to the same bucket and have the same server assignment.

In the foregoing "two-level" database query scheme, it should be appreciated that the SFT module containing fully qualified flow identification information is consulted only when there is a server clash at a hash location in the HFT module. As such, subsequent packets of the incoming flows may be forwarded or distributed to the servers based on the information contained in the HFT module alone or based on the information of both HFT and SFT modules, if and when necessary. Also, those skilled in the art will recognize that the size of the SFT module can be expected to be much smaller than the linearly-compressed HFT module in typical applications.

Returning to FIG. 2, the packet distributor node 200 may be provided with one or more subsystems or database modules implemented in persistent memory and/or other suitable storage structures 206 for effectuating the "two-level" database query functionality outlined above for purposes of packet forwarding. As illustrated, a hash function module 216 is operative to generate a plurality or range of hash values or indices based on flow identification parameters of incoming flows. HFT module 208 and SFT module 210 may be provided as suitable database structures or portions (e.g., a first database portion and a second database portion, respectively) having appropriate data fields associated with the hash indices, as will be exemplified in further detail below. It will be realized that the size of the HFT and/or SFT modules 208/210 may be dependent on the associated hashing function employed in a particular packet distribution application. For example, if the selected hashing function gives the hash values in range of 1 to N, then the HFT data structure may contain N entries, wherein each entry may be associated with a plurality of data fields. A server association module 212 may be provided as part of the packet distributor node 200 for associating a server with an incoming flow. As pointed out earlier, this associative relationship may be effectuated based on a number of techniques, including but not limited to, round-robin assignment, weighted round-robin assignment, binary tree arbitration, etc., which may include in some example embodiments at least some aspects of server resource availability, fairness, prioritization of incoming flows and/or servers, and the like. By way of an illustrative example, an incoming packet of a new flow may be transmitted to all servers in a server pool and when a response is received from a particular server (e.g., S1), the new flow may then be assigned to and/or otherwise associated with S1. The HFT and SFT database portions 208/210 may thereafter be updated with the new flow-to-server mapping relationship for effectuating packet distribution processes as will be set forth in additional detail below.

Continuing to refer to FIG. 2, a packet processing module 218 is operative to perform a plurality of processes and/or sub-processes relative to packet distribution based on the contents of the HFT/SFT databases. In an example implementation, the contents of the HFT/SFT databases may be configured to provide appropriate logic for selecting different processes and/or sub-processes depending on whether the incoming communication flow is a new flow, an existing flow, or whether the incoming packet includes an end-of-flow indication. Accordingly, a flow identification module 214 may be provided in a cooperative relationship with the remaining modules for determining a new flow packet by examining suitable flags or identifiers (e.g., a SYN flag in TCP). As described above, when a new flow is identified, the server association module 212 may be invoked to associate a server therewith. Further, the flow identification module 214 is similarly operative to determine that an existing flow is ending or to be terminated, preferably by examining the incoming packet's end-of-flow flags or identifiers (e.g., a FIN flag in TCP). Depending on the contents of HFT/SFT databases and the flow type, the packet processing module 218 may execute a new flow process 218A, or an end-of-flow process 218B, or an existing flow process 218C, for appropriately forwarding the incoming packets, and suitably updating the HFT/SFT modules, if necessary. Those skilled in the art will recognize that the packet distributor node 200 may be provided with suitable input/output (I/O) interfaces to interact with the upstream server-side connections as well as downstream connections with other network elements, as illustrated in FIG. 2 by interfaces (I/F) 220 and 222, respectively.

FIG. 3A depicts an example HFT database module 300A for use with an embodiment of a packet distribution scheme of the present patent application. By way of illustration, the example HFT database module 300A is operative in association with the hashing function 216 to generate a range (1 to N) of hash indices 302A, wherein each index entry may be provided with four pieces of information stored in suitable data fields 312 associated therewith. As described above, a Flow-bit 304 is a single-bit field that may be set (e.g., "flow exists" bit) when there is at least one communication flow associated with the hash index (i.e., the flow's identification parameters hash to that index by using the selected hashing function 216, which may employ any known or heretofore unknown hashing techniques, e.g., checksums, cyclic redundancy checks, cryptographic and/or non-cryptographic hashing, etc. and/or a combination thereof). A server field 308 is operative to indicate or otherwise identify the server associated with the particular hash index entry. It should be appreciated that this field will typically always have a value when the Flow-bit 304 is set. Otherwise, an error or anomalous condition may be encountered or otherwise indicated in an embodiment of the packet distribution scheme. Where there are multiple flows that map (i.e., hash) to the same hash entry and have the same destination server, a counter data field 310 may used to maintain or otherwise track the count of such flows. Typically, the default value of counter 310 is 1, which indicates that there is one flow that is mapped to the hash index entry and is associated with the server identified in the server field 308. Whenever the Flow-bit is set, the counter field 310 (e.g., comprising a 4-bit field) may be is set to binary 1 (i.e., [0001]) as an initial condition. Where there are multiple flows that map to the same hash index entry but are associated with different destination servers, a Clash-bit field 306 (e.g., a single-bit field or "clash exists" bit) may be set, as discussed hereinabove. For example, hash index of

[2] is shown with the Flow-bit 304 being set (i.e., at least a flow exists) and the Clash-bit 306 being set (i.e., there exist at least two flows mapping to this hash index and have separate destination servers).

FIG. 3B depicts an example SFT database module 300B for use with an embodiment of a packet distribution scheme of the present patent application. As explained previously, example SFT database module 300B may contain complete information to identify a flow (i.e., fully qualified flow identification) and associated server mapping. For IPv4 flows, as an example, SFT database module 300B may contain a hash index column or vector 302B (which is typically a subset that identifies the hash indices having respective Clash-bit fields set in the HFT module 300A), wherein the each hash index entry is associated with the corresponding flow's fully qualified identification parameters, e.g., the five-tuple of IP SRC 322 (containing source IP address), IP DEST 324 (containing destination IP address), Protocol 326 (identifying the communication protocol), SRC PORT 328, and DEST PORT 330, as well as the server 332 assigned to the flow.

Figure 4:
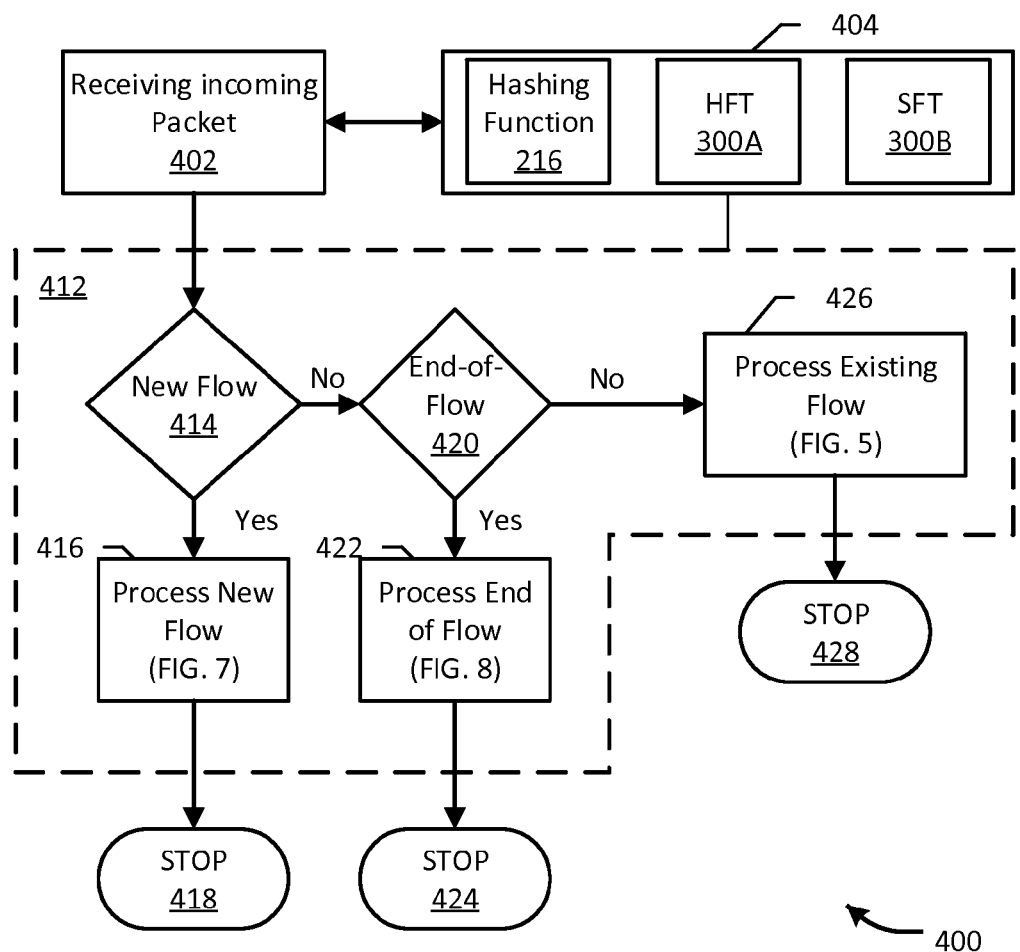
FIG. 4 depicts an example process flow relative to an embodiment of a packet distribution scheme of the present patent application.

Turning to FIG. 4, depicted therein is an example process flow relative to an embodiment of a packet distribution scheme 400 of the present patent application. On receiving an incoming packet (block 402), appropriate hashing functionality and associated database query (e.g., a look-up) may be applied as set forth at block 404. Responsive thereto, a packet processing block 412 is operative to determine and select one or more appropriate sub-processes depending on whether the received packet is for a new flow (block 414), an end-of-flow packet (block 420), or is for an existing flow (as determined by taking the NO paths from blocks 414 and 420). For a new flow packet, a new flow process or sub-process (block 416) may be executed (as exemplified in FIG. 7, for instance), whereupon the overall process flow ceases (block 418), e.g., until a next packet is received. For an end-of-flow packet, an end-of-flow process or sub-process (block 422) as exemplified in FIG. 8 may be executed, whereupon the overall process flow may be terminated (block 424). With respect to an existing flow, an existing flow process or sub-process (block 426) as exemplified in FIG. 5 may be executed, whereupon the overall process flow stops (block 428). As will be realized by one skilled in the art, the overall process may be iterated or otherwise continued as long as there are incoming packets being received at the packet distribution system with respect to the various client communication flows present in a network environment.

Figure 5:
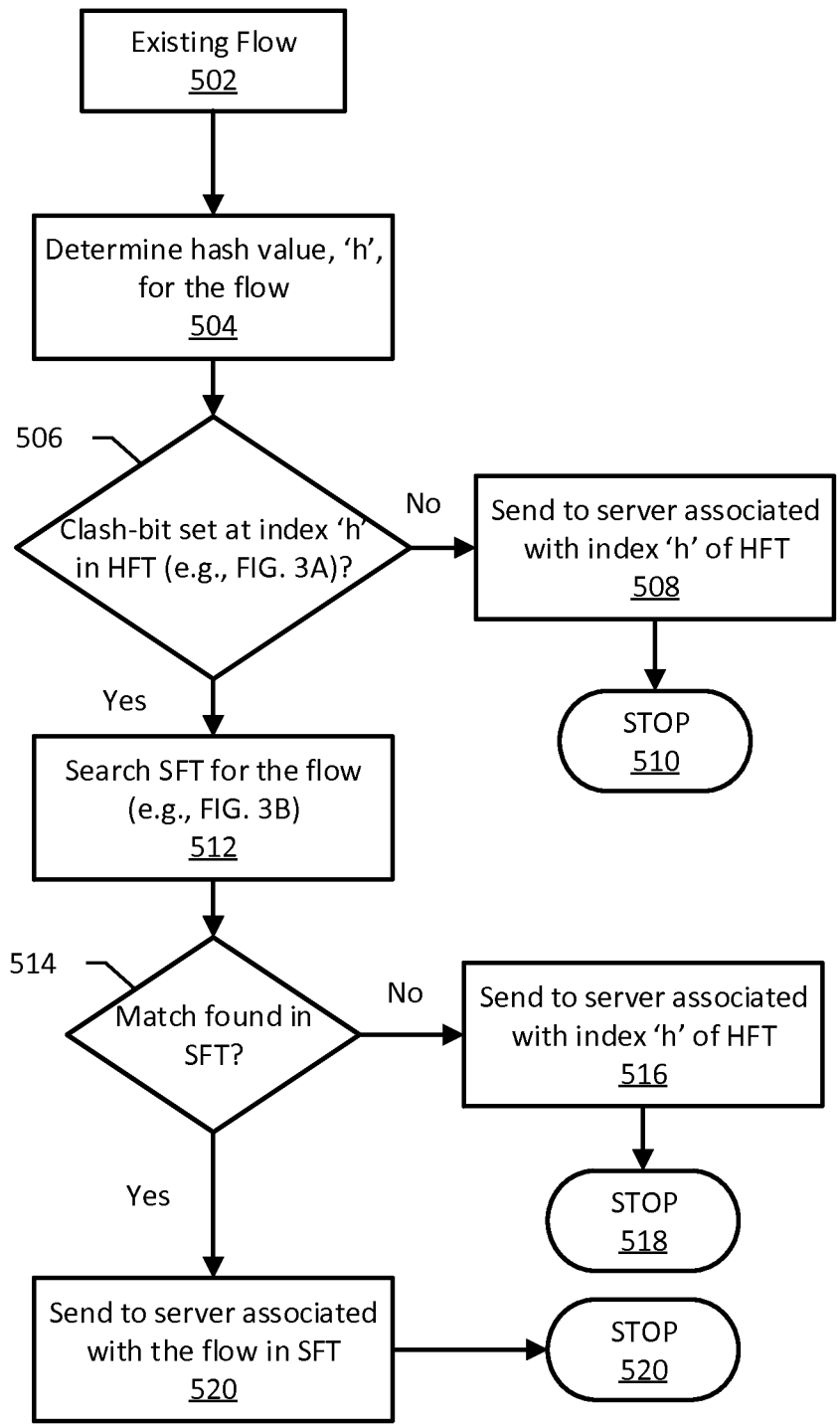
FIG. 5 is a flowchart of blocks relative to various steps and/or acts that may take place for processing packets of an existing communication flow according to an embodiment of the present patent application.

FIG. 5 is a flowchart of blocks relative to various steps and/or acts that may take place for processing packets of an existing communication flow according to an embodiment 500. Upon determining that the incoming packet is for an existing flow (block 502), a hash value or index ("h") is determined (block 504) based on the associated flow identification parameters. A first database portion, e.g., HFT database module 300A, is then queried to determine whether the Clash-bit associated with the hash index "h" is set (block 506). If so, a second database portion (e.g., SFT database module 300B) is queried (block 512) to determine if there is a match or "hit" therein for the index (block 514). If so, the received packet is forwarded to the server associated with the flow (or otherwise identified therewith) in the second database portion as set forth at block 520. Thereafter, the existing flow process 500 comes to a termination (block 520).

It will be realized that based on the binary logic of the Clash-bit and the Flow-bit fields of the first database portion 300A, four conditionalities may be obtained. FIG. 6 depicts an example conditionality matrix 600 associated with certain data fields of a hash index for purposes of the present patent application. Where both Flow-bit and Clash-bit are set, a query into the second database portion 300B may be triggered, as described above. On the other hand, if Clash-bit is not set but Flow-bit is set, there is no need to query the second database portion 300B and the packet may be forwarded to the server associated with the flow (or otherwise identified therewith in the server data field of the hash index "h") of the first database portion 300A, as set forth in block 508. An error condition may be designated where Flow-bit is not set for an existing flow, as indicated in the conditionality matrix 600 of FIG. 6. However, if there is a hit for the hash index found in the second database portion 300B but there is no server identified therein for some reason, a default treatment may be provided whereby the packet is forwarded to the server identified with the hash index "h" in the first database portion 300A, as set forth at block 516. It should be appreciated that other treatments may be provided in additional or alternative implementations. Regardless, once the packet is processed for forwarding to the server identified in the HFT database module, the existing flow process 500 comes to a termination, as set forth in blocks 510, 518.

Figure 7:
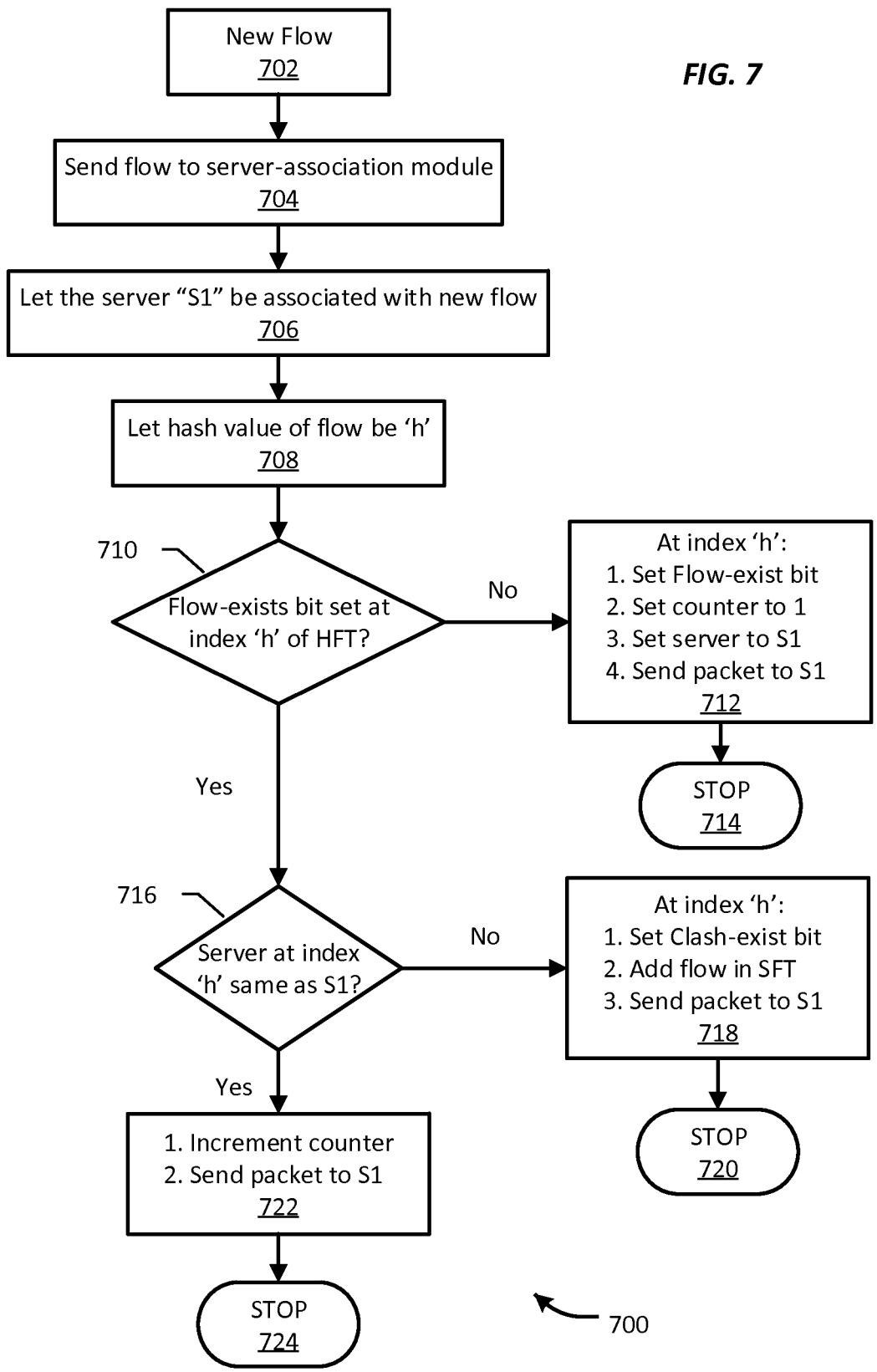
FIG. 7 is a flowchart of blocks relative to various steps and/or acts that may take place for processing packets of a new communication flow according to an embodiment of the present patent application.

Referring now to FIG. 7, depicted therein is a flowchart of blocks relative to various steps and/or acts that may take place for processing packets of a new communication flow according to an embodiment 700 of the present patent application. As before, upon determining that the incoming packet is for a new communication flow (block 702), a particular server of the server pool (e.g., S1) may be identified and assigned or otherwise associated with the flow (blocks 704, 706). Thereafter, a hash value or index ("h") may be determined (block 708) based on the associated flow identification parameters as previously described. A first database portion, e.g., HFT database module 300A, is then queried to determine whether a Flow-bit is set for the hash index "h" (block 710). Upon determining that the Flow-bit field associated with the hash index "h" is not set, a plurality of acts may be executed as set forth at block 712. As illustrated, the Flow-bit field is set (indicating that a flow is now associated with respect to the hash location). In addition, the counter field of the hash index "h" is set to 1 and the server field to set to identify S1. The received packet may then be forwarded to the identified server S1, whereupon the new flow process 700 terminates (block 714).

If the Flow-bit field associated with the hash index "h" is set (block 710), a further determination may be made with respect to the server field (block 716). If the server field at the hash index "h" already identifies a server that is different from the particular server (S1) associated with the incoming flow, another set of acts may then be executed as set forth at block 718. Consistent with the teachings set forth hereinabove, a Clash-bit field of the hash index "h" in the first database portion 300A is set to indicate the existence of a "clashing" server. The incoming new flow is then added to the second database portion, i.e., SFT database module 300B, with the flow being identified by its fully qualified flow ID parameters and associated with S1. The received packet is thereafter forwarded to the identified server S1, whereupon the new flow process 700 terminates (block 720).

On the other hand, if the server field at the hash index "h" identifies a server that is the same as the particular server (S1) associated with the incoming flow, yet another set of acts may be executed as set forth at block 722. A counter field of the hash index "h" in the first database portion, i.e., HFT database module 300A, is incremented by one and the incoming new flow packet is forwarded to S1. Thereafter, the new flow process 700 terminates (block 724).

It will be realized that by utilizing only a single-bit field (Flow-bit) to indicate the existence of a flow (e.g., as set forth in block 712), memory requirements to store a complete set of flow ID parameters may be substantially reduced. Also, because only the counter value is incremented to indicate multiple flows having the same hash index and assigned to the same destination server, no additional flow ID parameters need to be stored in the HFT database module. Accordingly, additional memory space savings may be realized by incrementing the counter value instead of storing flow ID information for multiple flows as set forth herein.

Figure 8:
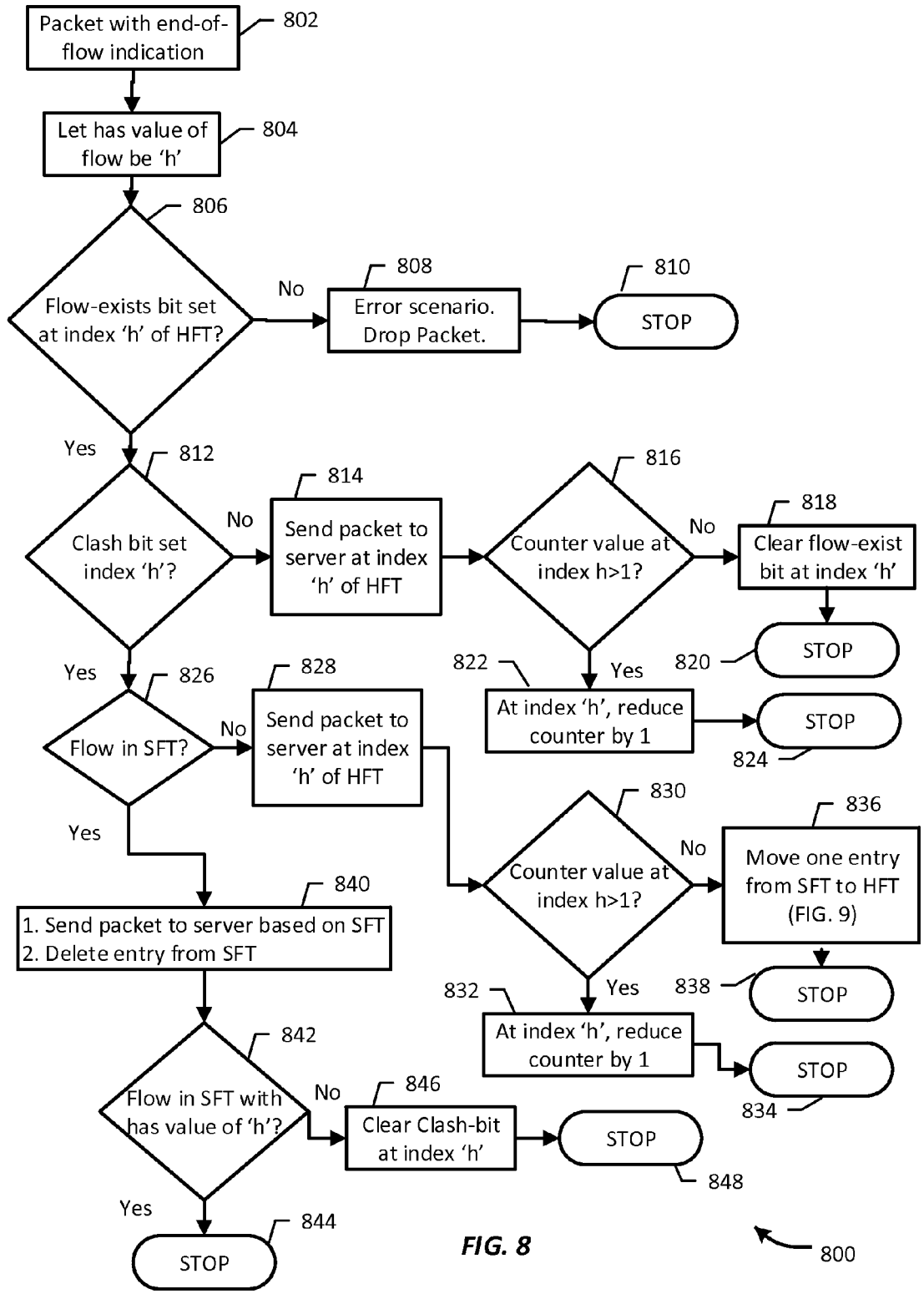
FIG. 8 is a flowchart of blocks relative to various steps and/or acts that may take place for processing an incoming packet with end-of-flow indication according to an embodiment of the present patent application.

FIG. 8 is a flowchart of blocks relative to various steps and/or acts that may take place for processing an incoming packet with end-of-flow indication according to an embodiment 800 of the present patent application. In general, the overall thrust of the end-of-flow process embodiment 800 is that if the flow exists in the SFT database module, it is deleted from that database and a verification is made to determine whether the Clash-bit field associated with the flow's hash index in the HFT database module needs to be cleared. However, if the flow is not found in the SFT database module, then the counter field in the HFT database module is decremented. If the counter reaches zero, the SFT database module is queried to check if there is any flow that maps to an entry in the HFT database module. If such a flow is found, it is moved from the SFT database module to the HFT database module. A detailed description of the various steps and associated blocks of the process flow 800 is set forth immediately below.

Upon determining that the incoming packet includes an end-of-flow indication (e.g., a FIN packet in TCP or an ABORT packet in SCTP), a hash index is determined for based on the flow ID parameters (blocks 802, 804). A first database portion, e.g., HFT database module 300A, is then queried to determine whether a Flow-bit is set for the hash index "h" (block 806). If the Flow-bit is not set, it represents an error condition and the received packet may be dropped (block 808), whereupon the process flow terminates (block 810). Upon determining (block 806) that the Flow-bit field associated with the hash index "h" is set, a further determination may be made (block 812) with respect to the Clash-bit field associated with the hash index "h". If the Clash-bit is not set, the following acts may be performed: forwarding (block 814) the received packet to the server identified in the server data field of the hash index; if the counter data field of the hash index is determined (block 816) to be greater than 1, reducing or decrementing (block 822) the counter data field by 1; and if the counter data field of the hash index is determined (block 816) to be not greater than 1, clearing (block 818) the Flow-bit of the hash index. The end-of-flow process 800 may then terminate as set forth at blocks 820 or 824, depending on the conditional steps traversed.

On the other hand, if both Flow-bit and Clash-bit fields associated with the hash index "h" are set in the first database portion (blocks 806 and 812), the following acts may be performed: querying (block 826) a second database portion (i.e., the SFT database module 300B) to determine if the second database portion (300B) contains the flow identification parameters of the communication flow, and if so, forwarding (block 840) the received packet to a server identified in the second database portion (300B) as being associated with the communication flow and deleting (block 840) the communication flow's identification parameters from the second database portion (300B). Further, if it is determined at block 842 there are no additional flows having the same hash index in the second database portion (300B), the Clash-bit of the hash index in the first database portion (300A) is cleared as set forth at block 846. The process flow may be terminated thereafter as set forth at blocks 844 or 848, depending on the conditional steps traversed.

If querying (block 826) the second database portion (300B) yields that the communication flow does not exist in the second database portion (300B), the received packet is forwarded (block 828) to the server identified in the server data field of the hash index in the first database portion (300A). Additionally, if the counter data field of the hash index is determined (block 830) to be greater than 1, the counter data field value is decremented or reduced by 1 (block 832), whereupon the process flow 800 may be terminated (block 834). If the counter data field of the hash index is determined (block 830) to be not greater than 1, a flow entry may be moved from the second database portion (300B) to the first database portion (300A) as set forth at block 836, which will be described in further detail hereinbelow with respect to FIG. 9. Thereafter, the process flow 800 terminates (block 838).

It should be appreciated that several individual scenarios may be possible with respect to deleting a flow within the foregoing end-of-flow process 800. Assuming that the Flow-bit is set (otherwise an error scenario will obtain), the following section summarizes example scenarios. When the Clash-bit is not set and counter value is 1, the scenario represents a situation where only one flow is mapped to the hash index. In such a case, the Flow-bit is unset or cleared and counter is set to 0 (indicating the single flow is deleted), and the packet is sent to server corresponding to server in the HFT entry. Where the Clash-bit is not set and counter value is more than 1, the scenario represents a situation of multiple flows mapping to the index with same destination server. Here, the counter value is decremented by 1 and the packet is sent to server corresponding to server in the HFT entry. If the Clash-bit is set and the counter value is greater than 1, this case represents a scenario where multiple flows map to same index with different destination servers. Here, the flow is first looked up in the SFT database and assuming a hit (i.e., the flow exists in the SFT database), three actions are taken: (i) the packet is sent to server corresponding to the SFT entry; (ii) the entry is then deleted from the SFT database; and (iii) all entries in the SFT database are processed to check if any of them contains a flow with the same hash value "h". If none of the entries contain a flow with the same hash value, the Clash-bit is cleared in the HFT database. However, if the flow does not exist in the SFT database, the packet is sent to the server identified in the HFT entry of "h" and the counter value is decremented by 1. If the Clash-bit is set and the counter value is 1, this case represents a scenario where multiple flows map to same hash index with different destination servers. In such a situation, the flow is first looked up in the SFT database, and multiple acts may be executed as in the previous scenarios depending the hit condition. One skilled in the art will recognize that additional scenarios are also possible depending on whether the flow exists in the SFT database.

Figure 9:
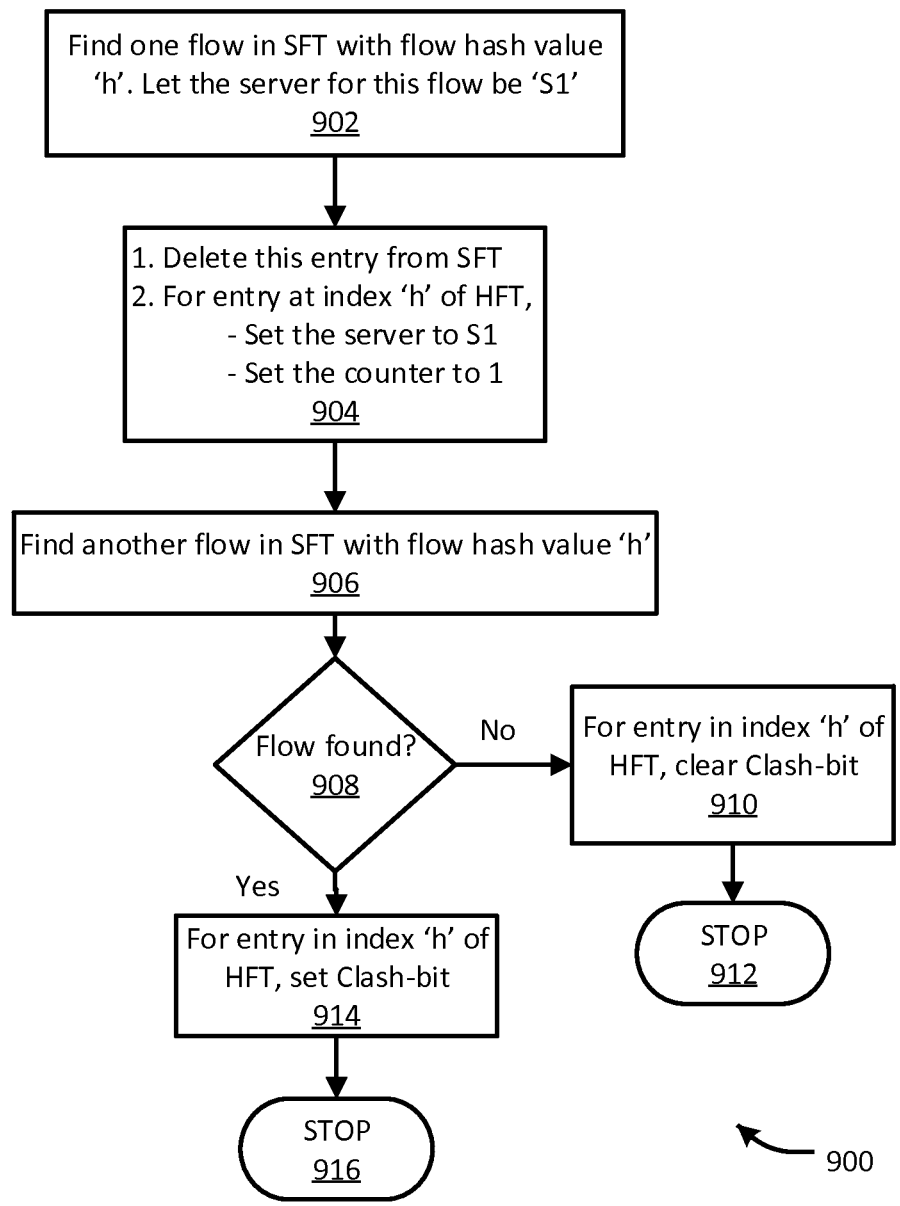
FIG. 9 depicts a flowchart of blocks relative to various steps and/or acts that may take place for moving an entry from the example SFT database module to the example HFT database module for purposes of the present patent application.

FIG. 9 depicts a flowchart of blocks relative to various steps and/or acts that may take place with respect to an embodiment 900 for moving an entry from the SFT database module to the HFT database module for purposes of the present patent application. At block 902, a flow having the hash index "h" is found in the SFT database module. A server associated the flow is illustratively designated as S1. At block 904, a plurality of acts are illustrated. The fully qualified flow entry is first deleted from the SFT database module. For the hash index "h" location in the HFT database module, the server field is set to identify S1 and the counter field associated therewith is set to 1. Thereafter, the SFT database module is queried again to find another flow with the same hash index "h", as set forth at blocks 906, 908. If such a flow is found, the Clash-bit field associated with hash index "h" in the HFT database module is set (block 914), whereupon the process flow is terminated (block 916). Otherwise, the Clash-bit field associated with hash index "h" in the HFT database module is cleared (block 910) and the process flow is terminated (block 912).

Based upon the foregoing Detailed Description, it should be appreciated that one or more embodiments of the present disclosure can be advantageously implemented in a number of packet distribution applications, including, e.g., load balancing/sharing among a pool of servers configured to process a large number of client requests within a distributed network environment. In the context of load balancing, the packet distributor system of the present application may be referred to as a "load balancer" configured to interface with the servers. One skilled in the art will recognize no special inter-processing communication (IPC) is needed between the load balancer and associated servers in order to effectuate processing of larger volume flows (e.g., elephant flows), which may be necessary in some implementations. Accordingly, no special elephant trap notifications and elephant trap processes need to be executed at the servers. Server-to-flow association techniques set forth above allow for servers to be added or deleted from the server pool without having to inform the load balancer of such dynamic changes within the network. While significantly reducing storage requirements necessary for hashing-based packet distribution techniques, example embodiments set forth herein also maintain desirable features such as High Availability (HA), In-Service Software Upgrade (ISSU) capability, and Load Correction, that are especially relevant with respect to transient states in a packet distribution environment. Additionally, example embodiments of the present disclosure tend to be agnostic relative to the size of communication flows, i.e., both larger volume flows (e.g., elephant flows) and smaller volume flows (e.g., mice flows) may be treated substantially similarly without specifically distinguishing between them.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. In addition the acts, steps, functions, components or blocks illustrated in a particular flowchart may be inter-mixed or otherwise inter-arranged with the acts, steps, functions, components or blocks illustrated in another flowchart in order to effectuate additional variations, modifications and configurations with respect to one or more implementations for purposes of the present patent disclosure. Furthermore, other blocks may be added/inserted between the blocks that are illustrated. Finally, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A packet distribution method operating at a packet distributor for forwarding communication flows to one or more servers, the method comprising:
   receiving a packet of a communication flow;
   hashing one or more flow identification parameters of the packet to obtain a hash index;
   storing in a first database portion a plurality of hash indices based on hashing one or more flow identification parameters associated with a plurality of incoming communication flows being received, each hash index associated with a plurality of data fields;
   if the communication flow is a new flow, processing the packet according to a new flow process at least based on values of one or more data fields of the plurality of data fields provided for the hash index in the first database portion;
   if the communication flow is an existing flow, processing the packet according to an existing flow process at least based on the values of the one or more data fields provided for the hash index in the first database portion; and
   if the received packet is an end-of-flow packet, processing the packet according to an end-of-flow process at least based on the values of the one or more data fields provided for the hash index in the first database portion,
   wherein the plurality of data fields comprise (i) a single bit field (Flow-bit) configured to indicate whether there exists at least one communication flow having the flow identification parameters that hash to a specific hash index; (ii) a server data field configured to identify a server of the one or more servers that is assigned to serve the at least one communication flow having the flow identification parameters that hash to the specific hash index; and (iii) a counter data field that is incremented when flow identification parameters of two communication flows having a same server assignment hash to a same hash index resulting in a hash collision scenario, and further wherein a single hash index entry is provided in the first database portion operative for forwarding packets of the two communication flows in the hash collision scenario.

2. The packet distribution method as recited in claim 1, wherein the one or more flow identification parameters comprise a source Internet Protocol (IP) address, a destination IP address, a source port address, a destination port address, and a protocol identifier.

3. The packet distribution method as recited in claim 2, wherein the protocol identifier is one of a Transmission Control Protocol (TCP) and Stream Control Transmission Protocol (SCTP).

4. The packet distribution method as recited in claim 3, wherein the new flow is determined by examining a new flow identifier in the received packet.

5. The packet distribution method as recited in claim 3, wherein the received packet is determined as the end-of-flow packet by examining an end flow identifier in the received packet.

6. The packet distribution method as recited in claim 1, wherein the plurality of data fields of the first database portion further comprises another single bit field (Clash-bit) that is set when flow identification parameters of two communication flows assigned to different servers hash to an index resulting in another hash collision scenario.

7. The packet distribution method as recited in claim 6, wherein the existing flow process comprises, upon determining that the communication flow is an existing flow:
   determining if the Clash-bit associated with the hash index of the packet is set in the first database portion; and
   responsive to the determining that the Clash-bit is set, querying a second database portion to determine a set of fully qualified flow identification parameters for the communication flow and a server associated therewith for forwarding the packet.

8. The packet distribution method as recited in claim 6, wherein the new flow process comprises, upon determining that the communication flow is a new flow:
   associating and identifying a particular server with the communication flow;
   upon determining that the Flow-bit associated with the hash index is not set in the first database portion, performing:
      setting the Flow-bit of the hash index;
      setting the counter data field of the hash index to 1;
      setting the server data field of the hash index to identify the particular server as being associated with the communication flow; and
      forwarding the received packet to the particular server;
   upon determining that the Flow-bit associated with the hash index is set in the first database portion and if the server data field of the hash index identifies a server that is different than the particular server, performing:
      setting the Clash-bit of the hash index;
      adding the communication flow to a second database portion at the hash index; and
      forwarding the received packet to the particular server; and
   upon determining that the Flow-bit associated with the hash index is set in the first database portion and if the server data field of the hash index already identifies the particular server, performing:
      incrementing the counter data field by 1; and
      forwarding the received packet to the particular server.

9. The packet distribution method as recited in claim 6, wherein the end-of-flow process comprises, upon determining that the received packet includes an end flow identifier:
   upon determining that the Flow-bit associated with the hash index is not set in the first database portion, dropping the received packet;
   upon determining that the Flow-bit associated with the hash index is set in the first database portion and determining that the Clash-bit associated with the hash index is not set, performing:

forwarding the received packet to the server identified in the server data field of the hash index; if the counter data field of the hash index is determined to be greater than 1, reducing the counter data field by 1; and if the counter data field of the hash index is determined to be not greater than 1, clearing the Flow-bit of the hash index; and upon determining that the Flow-bit associated with the hash index is set in the first database portion and determining that the Clash-bit associated with the hash index is also set, performing:

querying a second database portion to determine if the second database portion contains the flow identification parameters of the communication flow, and if so, forwarding the received packet to a server identified in the second database portion as being associated with the communication flow and deleting the communication flow's identification parameters from the second database portion; and if it is determined there are no additional flows having the same hash index in the second database portion, clearing the Clash-bit of the hash index in the first database portion; and if querying the second database portion yields that the communication flow does not exist in the second database portion, forwarding the received packet to the server identified in the server data field of the hash index in the first database portion; and if the counter data field of the hash index is determined to be greater than 1, reducing the counter data field by 1; and if the counter data field of the hash index is determined to be not greater than 1, moving one flow entry from the second database portion to the first database portion.

10. A packet distributor node configured to forward communication flows to one or more servers, the packet distributor node comprising:

one or more processors coupled to a persistent memory;

a hash flow table (HFT) module forming a portion of the persistent memory, the HFT module configured to store a plurality of hash indices based on hashing one or more flow identification parameters associated with a plurality of incoming communication flows being received at the packet distributor node, each hash index associated with a plurality of data fields;

a supplementary flow table (SFT) module forming a portion of the persistent memory and configured to store fully qualified flow identification parameters with respect to communication flows that are assigned to different servers and have the same hash indices;

a server association module forming a portion of the persistent memory and configured to associate a server to an incoming communication flow received at the packet distributor node;

a flow identification module forming a portion of the persistent memory and configured to identify whether an incoming packet is for an existing communication flow, a new communication flow or an end-of-flow packet to indicate termination of the existing communication flow; and a packet processing module configured to process an incoming packet of a communication flow at least based on values of one or more data fields of the plurality of data fields associated with a hash index of the incoming packet's flow identification parameters, wherein the plurality of data fields comprise (i) a single bit field (Flow-bit) configured to indicate whether there exists at least one communication flow having the flow identification parameters that hash to a specific hash index; (ii) a server data field configured to identify a server of the one or more servers that is assigned to serve the at least one communication flow having the flow identification parameters that hash to specific the hash index; and (iii) a counter data field that is incremented when flow identification parameters of two communication flows having a same server assignment hash to a same hash index resulting in a hash collision scenario, and further wherein a single hash index entry is provided in the first hash flow table operative for forwarding packets of the two communication flows in the hash collision scenario.

11. The packet distributor node as recited in claim 10, wherein the one or more flow identification parameters comprise a source Internet Protocol (IP) address, a destination IP address, a source port address, a destination port address, and a protocol identifier.

12. The packet distributor node as recited in claim 11, wherein the protocol identifier is one of a Transmission Control Protocol (TCP) and Stream Control Transmission Protocol (SCTP).

13. The packet distributor node as recited in claim 12, wherein the flow identification module is adapted to determine a new communication flow by examining a new flow identifier in the incoming packet.

14. The packet distributor node as recited in claim 12, wherein the flow identification module is adapted to determine an end-of-flow packet by examining an end flow identifier in the incoming packet.

15. The packet distributor node as recited in claim 10, wherein the plurality of data fields of the HFT module further comprises another single bit field (Clash-bit) that is set when flow identification parameters of two communication flows assigned to different servers hash to an index resulting in another hash collision scenario, the Clash-bit operating to trigger querying the SFT when the Clash-bit is set.

16. A non-transitory computer-readable medium containing instructions stored thereon which, when executed by one or more processors of a packet distributor node, facilitate forwarding of communication flows to one or more servers, the non-transitory computer-readable medium comprising:

a code portion for hashing one or more flow identification parameters of an incoming packet of a communication flow to obtain a hash index;

a code portion for storing in a first database portion a plurality of hash indices based on hashing one or more flow identification parameters associated with a plurality of incoming communication flows being received, each hash index associated with a plurality of data fields;

a code portion, operative upon determining that the communication flow is a new flow, for processing the incoming packet according to a new flow process at least based on values of one or more data fields of the plurality of data fields provided for the hash index in a first database portion a code portion, operative upon determining that the communication flow is an existing flow, for processing the incoming packet according to an existing flow process at least based on the values of the one or more data fields provided for the hash index in the first database portion; and a code portion, operative upon determining that the incoming packet is an end-of-flow packet, for processing the packet according to an end-of-flow process at least based on the values of the one or more data fields provided for the hash index in the first database portion, wherein the plurality of data fields comprise (i) a single bit field (Flow-bit) configured to indicate whether there exists at least one communication flow having the flow identification parameters that hash to a specific hash index; (ii) a server data field configured to identify a server of the one or more servers that is assigned to serve the at least one communication flow having the flow identification parameters that hash to the specific hash index; and (iii) a counter data field that is incremented when flow identification parameters of two communication flows having a same server assignment hash to a same hash index resulting in a hash collision scenario, and further wherein a single hash index entry is provided in the first database portion operative for forwarding packets of the two communication flows in the hash collision scenario.

17. The non-transitory computer-readable medium as recited in claim 16, wherein the one or more flow identification parameters comprise a source Internet Protocol (IP) address, a destination IP address, a source port address, a destination port address, and a protocol identifier.

18. The non-transitory computer-readable medium as recited in claim 17, wherein the protocol identifier is one of a Transmission Control Protocol (TCP) and Stream Control Transmission Protocol (SCTP).

19. The non-transitory computer-readable medium as recited in claim 18, further comprising a code portion configured to determine a new flow by examining a new flow identifier in the incoming packet.

20. The non-transitory computer-readable medium as recited in claim 18, further comprising a code portion configured to determine an end-of-flow packet by examining an end flow identifier in the incoming packet.

21. The non-transitory computer-readable medium as recited in claim 16, wherein the plurality of data fields of the first database portion further comprises another single bit field (Clash-bit) that is set when flow identification parameters of two communication flows assigned to different servers hash to an index resulting in another hash collision scenario, the Clash-bit operating to trigger querying a second database portion when the Clash-bit is set.

* * * * *